June 12, 1956        C. BIEHLER        2,750,203
OCCUPANT PROTECTION BAR FOR AUTOMOBILE SEATS
Filed July 8, 1955        2 Sheets-Sheet 1
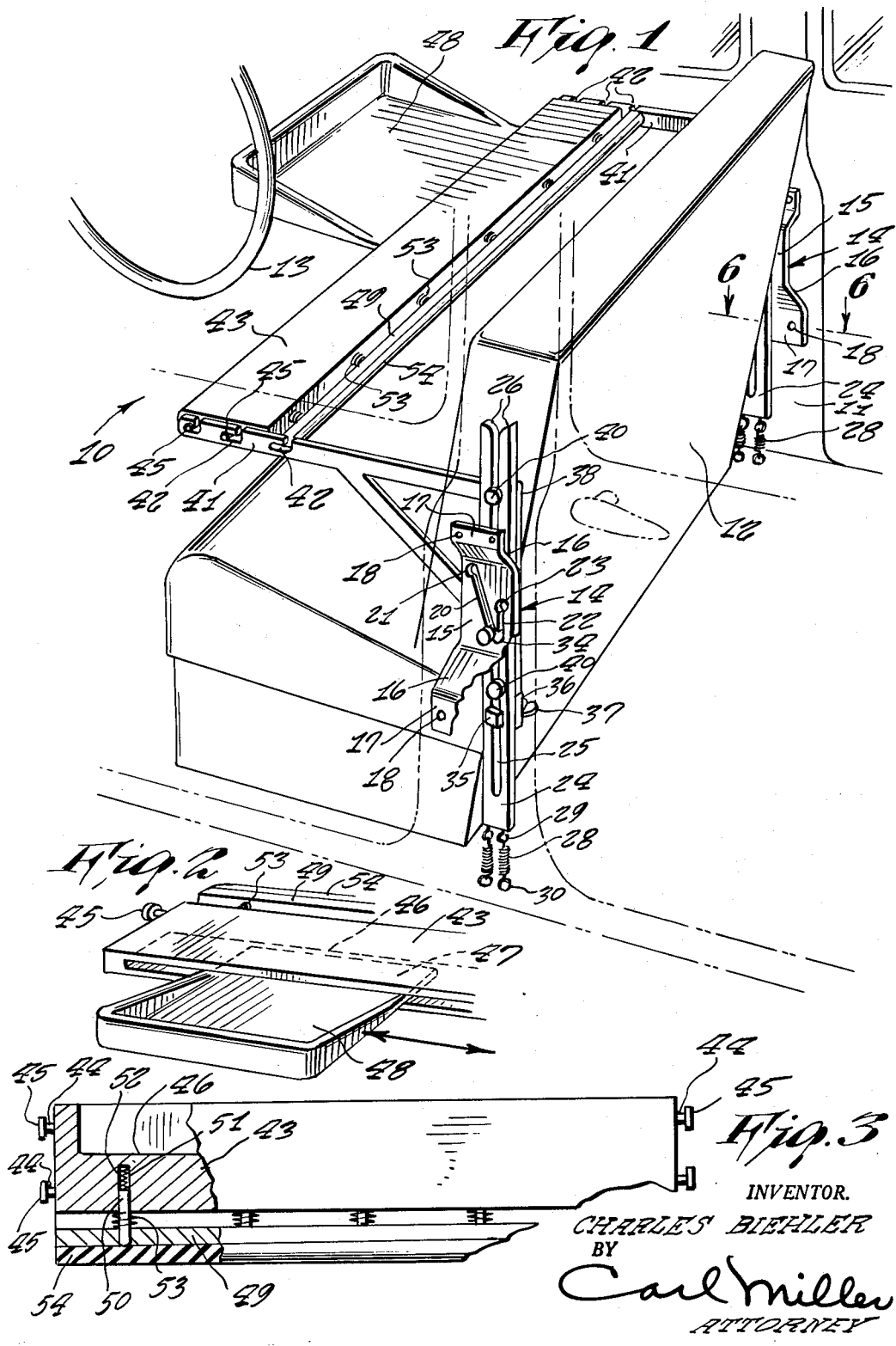
INVENTOR.
CHARLES BIEHLER
BY Carl Miller
ATTORNEY

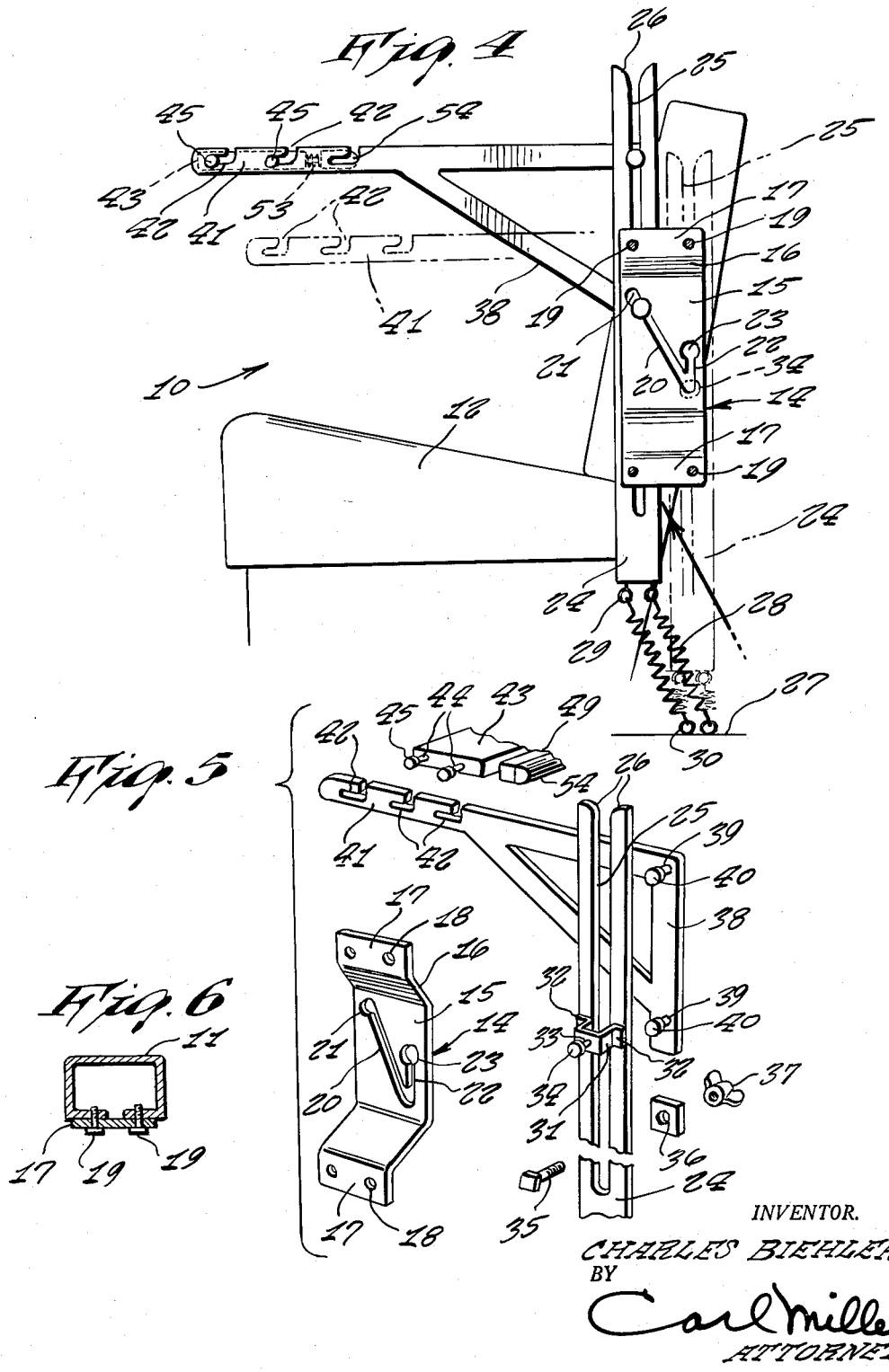

United States Patent Office 2,750,203
Patented June 12, 1956

2,750,203

OCCUPANT PROTECTION BAR FOR AUTOMOBILE SEATS

Charles Biehler, Bronx, N. Y.

Application July 8, 1955, Serial No. 520,664

7 Claims. (Cl. 280—150)

This invention relates to safety devices for automobiles or the like.

It is an object of the present invention to provide a safety device for automobiles which will prevent the passenger or driver from plunging forward when the car is suddenly stopped, to prevent injury thereby and wherein the impact is absorbed by the device itself in a novel manner.

It is another object of the present invention to provide a safety device of the above type which may be easily and readily removed when not in use and which, when in operative position, will serve as a convenient arm rest and tray as well as providing safety.

It is still another object of the present invention to provide a safety device of the above type which may be used also in airplanes, bus seats, sporting events and many other applications.

Other objects of the present invention are to provide a safety device for automobiles and the like bearing the above objects in mind which is of simple construction, has a minimum number of parts, is easy to use, inexpensive to manufacture and efficient in operation.

For other objects and a better understanding of the invention, reference may be had to the following detailed description taken in connection with the accompanying drawing, in which:

Figure 1 is a perspective view showing the invention in operative use in the front of an automobile;

Fig. 2 is a perspective view showing the slidable utility tray forming a part of the invention;

Fig. 3 is a plan view shown partly in section of the safety bar forming a part of the invention;

Fig. 4 is a side elevational view of the device showing the same in shock position;

Fig. 5 is an exploded perspective view of the mounting mechanism of the safety bar; and Fig. 6 is a sectional view taken along the line 6—6 of Fig. 1.

Referring now more in detail to the drawing, 10 indicates generally the interior of an automobile including a center post 11 and a front seat 12, as well as the usual steering wheel 13, substantially as illustrated.

In the practice of my invention, a pair of mounting plates indicated generally at 14 are secured to the center posts 11 at opposite sides of the seat 12, each of these plates including the central plate 15 integrally formed at its ends with the outwardly extending portions 16 which terminate in the flanges 17 secured to the center post by means of the mounting openings 18 and screws 19 (Fig. 6).

Each of the central plates 15 is provided with a downwardly and rearwardly extending diagonal slot 20 having an enlarged upper end 21 and which connects at its lower end with a vertical slot 22 having an enlarged upper end 23.

A pair of vertical bars 24 are provided with the central slots 25 extending downwardly from the upper ends thereof, the upper ends of the bars 24 being curved outwardly from the slot 25, as at 26, to facilitate the insertion downwardly therewithin of studs to be hereinafter described.

The lower ends of the vertical bars 24 are secured to the floor 27 of the car by means of the springs 28, the upper ends of the springs 28 being secured to the eyes 29 secured to the lower end of the bars while the lower ends of the springs are secured to the eyes 30 secured to the floor 27 (Fig. 4). A U-shaped bracket 31 is secured to the bars 24 by means of the flanges 32 welded thereto, the central portion of the bracket 31 fixedly carrying the stud 33 having the enlarged head 34. The head 34 is adapted to pass through the enlargements 21 and 23 to permit the stud 33 to ride within the slots 20 and 22 and to secure the bars at their upper ends to the mounting plates 14, the stud 33 normally resting in the intersection of the slots 20 and 22 as shown in dotted outline in Fig. 4.

A screw 35 is secured in adjustable manner within the slot 25 of the lower end thereof by means of the lock nut 36 and the wing nut 37, the nut 36 serving as a support for a triangular bracket 38 provided for each of the bars 24. Each of the triangular brackets 38 is provided with a pair of vertically spaced studs 39 having enlarged heads 40 of greater width than the slot 25, the studs 39 being adapted to ride within the slot and being passed downwardly from the open upper end thereof past the curved portions 26, to permit the bracket to rest on the nut 36.

Each of the triangular brackets 38 is integrally formed with the forwardly extending portions 41, each of which is provided with a plurality of longitudinally spaced, substantially L-shaped slots 42.

A safety bar of elongated rectangular stock 43 is provided and is adapted to fit between the extensions 41, the bar 43 at opposite ends being provided with a pair of studs 44 having enlarged heads 45. By means of the studs 44 and enlarged heads 45, the bar may be releasably mounted between the extensions 41 by moving the studs 44 downwardly within the L-shaped slots 42 and then forwardly with the heads 45 coming to rest at the forward ends of the slots. Thus the bar may not be removed without first moving it rearwardly and then raising it, while at the same time permitting the bar to be easily and readily removed when it is desired to remove the injured occupant or for any other purpose. The bar 43 along the forward edge thereof is provided with a continuous slot 46 within which is positioned the shank or flange 47 of the separable sliding tray 48 which may be adjusted laterally to the occupant's comfort and may be employed to support a map, refreshments or any other article.

To absorb shock, directly, the bar 49 is provided and fixedly mounts a plurality of longitudinally spaced pins 50 which are received within the corresponding openings 51 provided along the rear edge of the bar 43, a coil spring 52 being provided within each of the openings 51 intermediate the inner ends thereof and the ends of the pins 50 (Fig. 3). A second coil spring 53 surrounds each of the pins intermediate the bar 43 and bar 49. Rubber padding 54 is secured to the rear edge of the bar 49 for direct contact with the passenger or driver.

In operation, the device will normally be positioned as shown in Fig. 1, with the stud 33 positioned at the intersection of the slots 20 and 22. The device may then be used as a convenient arm rest and to support the weight of the driver's arms as well as a sliding utility tray 48 being provided. Upon the vehicle stopping suddenly in an emergency, the driver and passengers will be thrown forwardly against the bar 43, the immediate shock being absorbed by the pad 54 and springs 53. Additional impact will be absorbed by the movement of the bar and associated parts from the phantom position of Fig. 4 to the full line position shown therein, this movement being permitted by the movement of the studs 33 from the lower ends of the slot 20 to the upper ends thereof. Thus, the bar 43 will move upwardly and forwardly simultaneously to absorb some of the impact, while at the same time preventing the driver or passenger from being thrown forwardly against the windshield or wheel and serving thereby to save their lives in extreme cases.

It will be noted that the tray 48 may be slid laterally to the convenience of the driver or occupant and may serve as a table for refreshments as well as maps and other items. The bar 43 may also be easily and readily removed by means of the slots 42.

While various changes may be made in the detail construction, it shall be understood that such changes shall be within the spirit and scope of the present invention as defined by the appended claims.

Having thus set forth and disclosed the nature of my invention, what is claimed is:

1. A safety device comprising a pair of mounting plates secured to the center posts of the vehicle or the like, each of said plates having a downwardly and rearwardly extending slot communicating with a vertical slot extending upwardly from the lower rear end thereof, a pair of guide bars, a stud carried by each of said guide bars and adapted to move within said downwardly and rearwardly inclined slot, each of said guide bars having a downwardly extending slot, a pair of supporting brackets, each of said supporting brackets having a plurality of vertically spaced studs adapted to ride within said guide bar slots, a separable bar, releasable means for connecting said separable bar to said supporting brackets and shock absorbing means carried along the rear edge of said bar.

2. A safety device according to claim 1, each of said supporting brackets comprising a substantially triangular bracket having said studs along the rear vertical portion thereof and extensions extending forward from said brackets, said releasable means for connecting said bar thereto comprising said extensions having a plurality of longitudinally spaced, L-shaped slots, and studs carried by the ends of said bar adapted to be received within said slots, said studs having enlarged heads.

3. A safety device according to claim 2, said shock absorbing means comprising a second bar disposed rearwardly of said first bar and having a plurality of longitudinally spaced pins secured thereto, said first bar along the rear edge thereof having a plurality of longitudinally spaced openings receiving said pins therewithin, first springs within said openings inwardly of said pins, second springs surrounding each of said pins intermediate said first and second bars, and resilient material secured to the rear edge of said second bar.

4. A safety device according to claim 3, including springs securing the lower edges of said guide bars to the floor of the vehicle, a nut passing through said guide bar slots and adapted to support the lower ends of said supporting brackets in an adjustable manner.

5. A safety device according to claim 4, each of said mounting plates comprising a central portion integrally formed with outwardly extending portions terminating in flanges having mounting openings, said flanges being secured to the center post of the vehicle by screws positioned within said mounting openings, said supporting nut comprising a screw passing through said guide bar slots, a nut positioned on said screw and adapted to support the lower ends of said supporting brackets and a wing nut adjacent said first nut to permit the adjustment vertically of said first nut and thereby the elevation of said supporting brackets.

6. A safety device according to claim 5, said first bar along the forward edge thereof having a continuous slot, and a separable tray having a flat shank slidable within said slot whereby to adjust the position laterally of said tray.

7. A safety device according to claim 6, said first stud being carried by a U-shaped bracket having flanges secured to the guide bars on opposite sides of the slot thereof, said stud being secured to the central portion of said U-shaped bracket and having an enlarged head of greater diameter than the width of said guide bar slot, the upper ends of said guide bars being curved upwardly and outwardly away from said slot to facilitate the insertion therewithin of said stud on said U-shaped bracket.

References Cited in the file of this patent

UNITED STATES PATENTS

| | | |
|---|---|---|
| 2,586,063 | Kurtz | Feb. 19, 1952 |
| 2,661,221 | Lockwood | Dec. 1, 1953 |
| 2,678,249 | Rhoads | May 11, 1954 |

FOREIGN PATENTS

| | | |
|---|---|---|
| 1,008,155 | France | Feb. 13, 1952 |
| 1,083,434 | France | June 30, 1954 |